INVENTOR.
JOSEPH L. MENNITT
EUSTACE H. MUMFORD
URBAN P. TRUDEAU

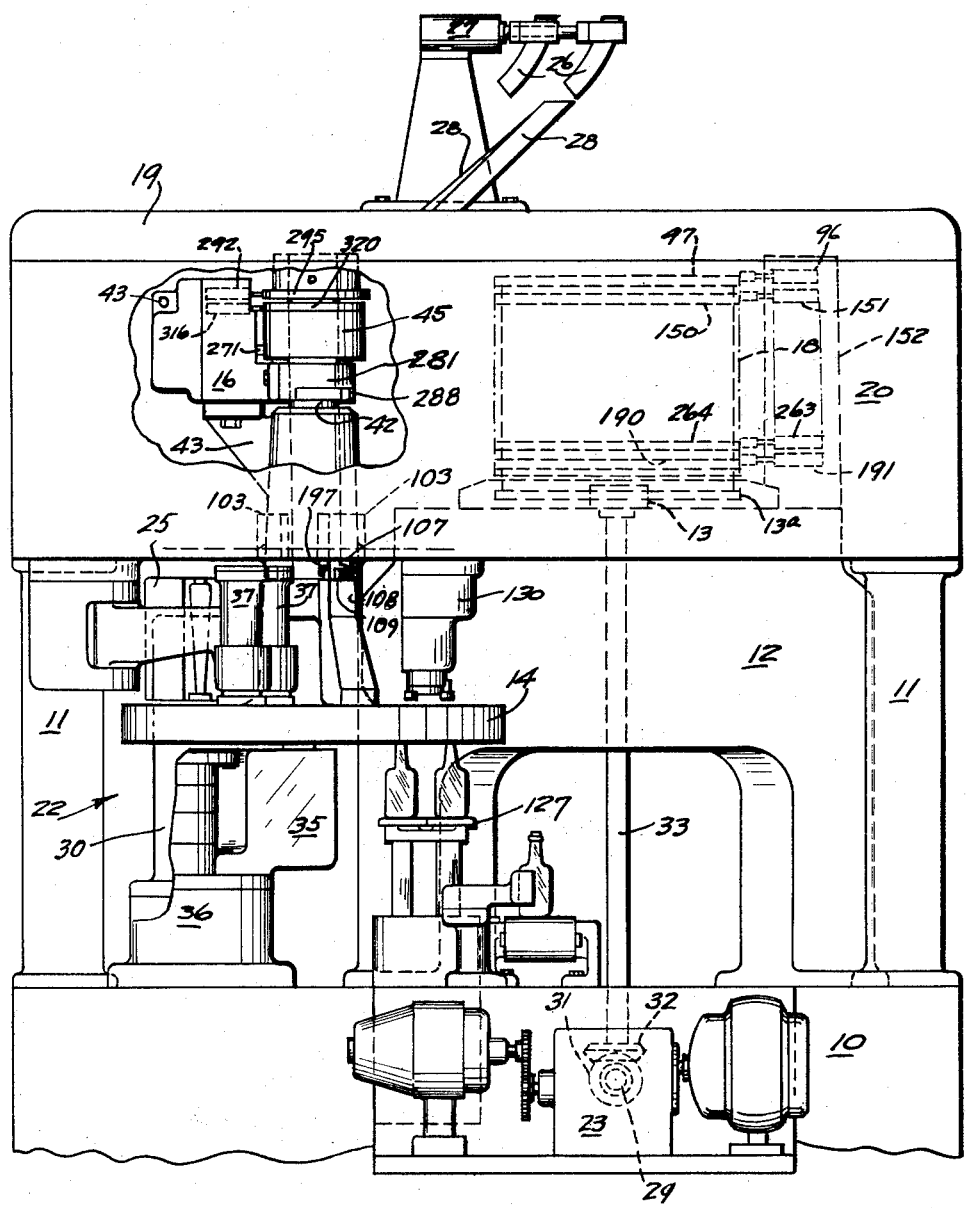

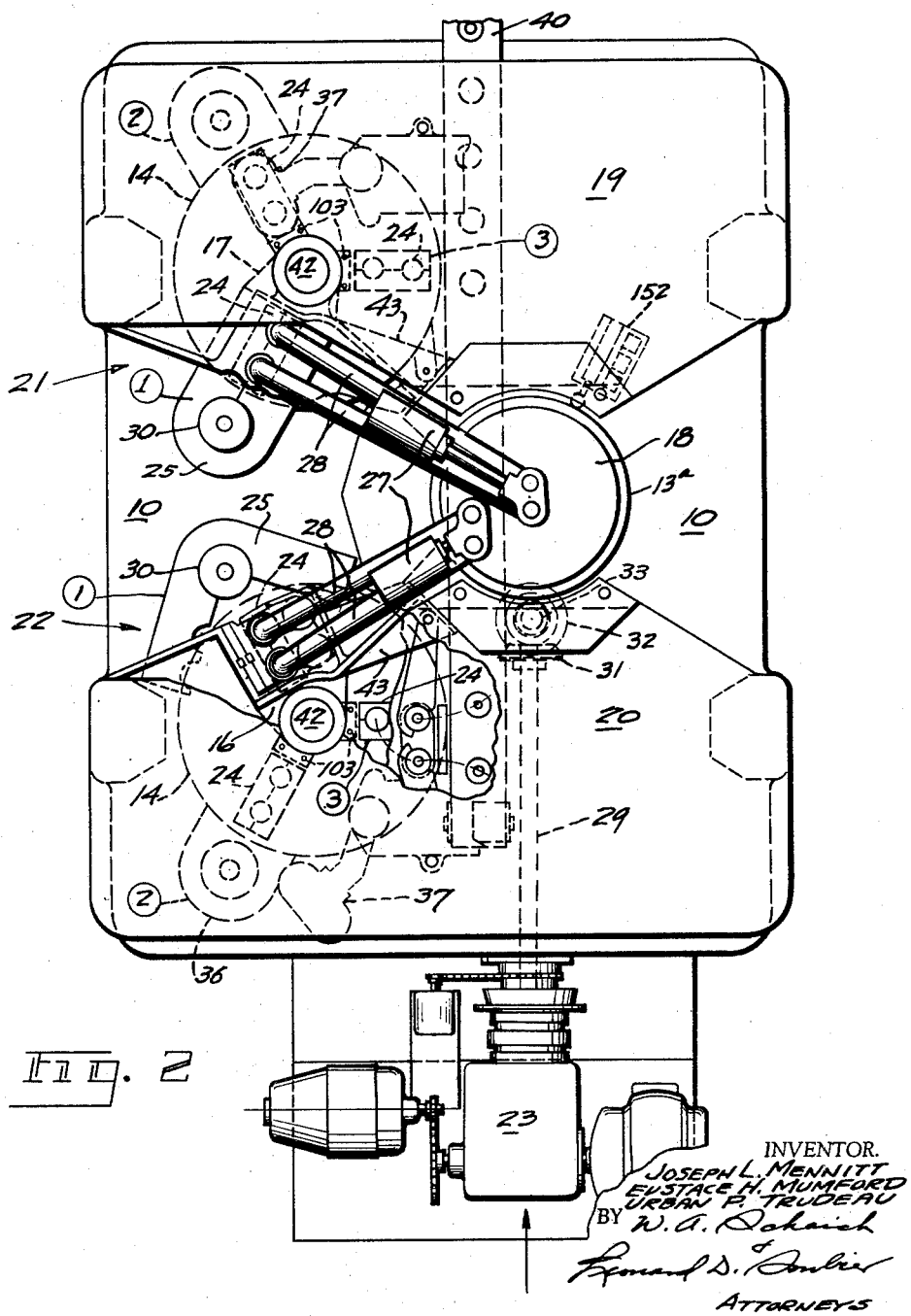

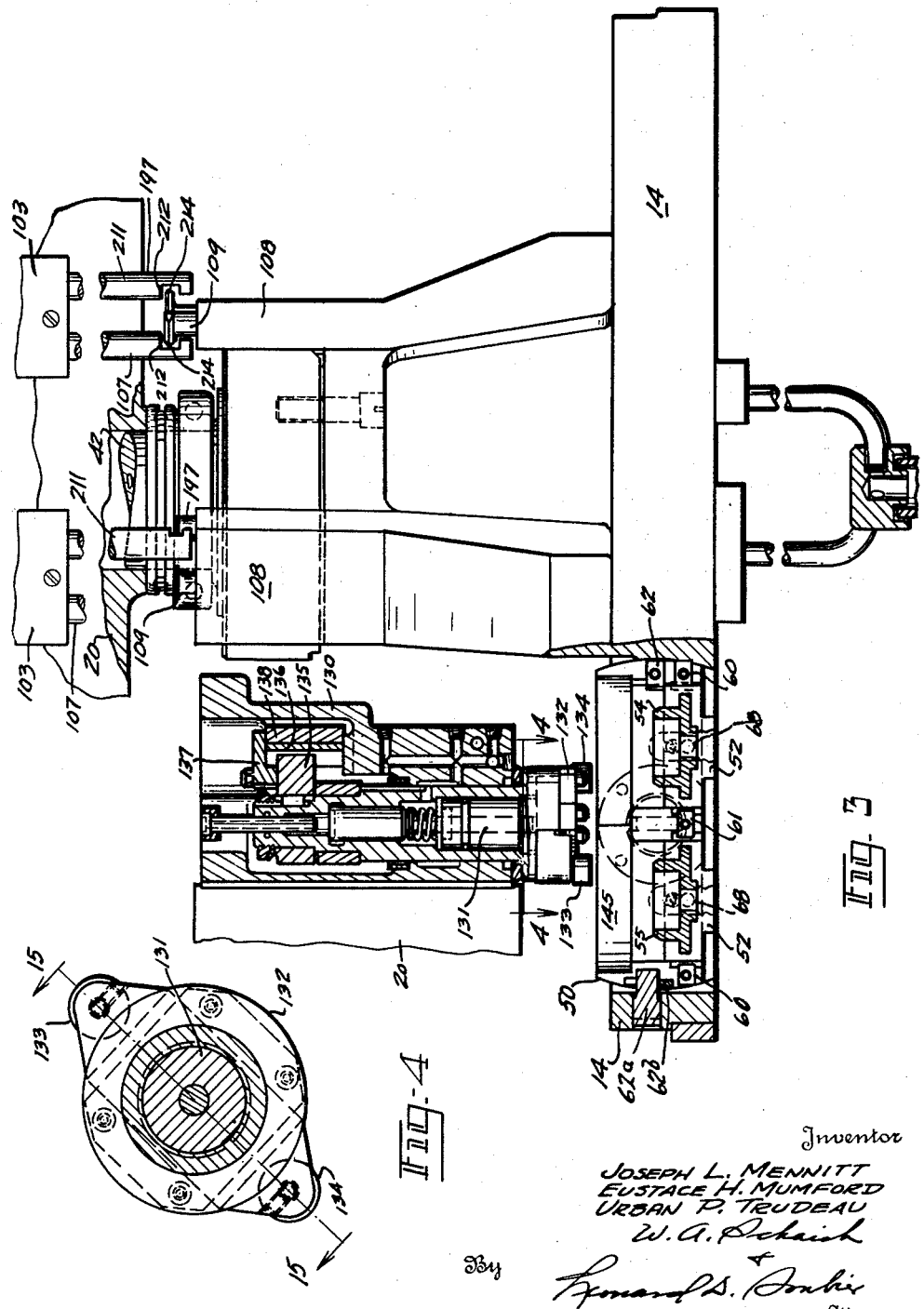

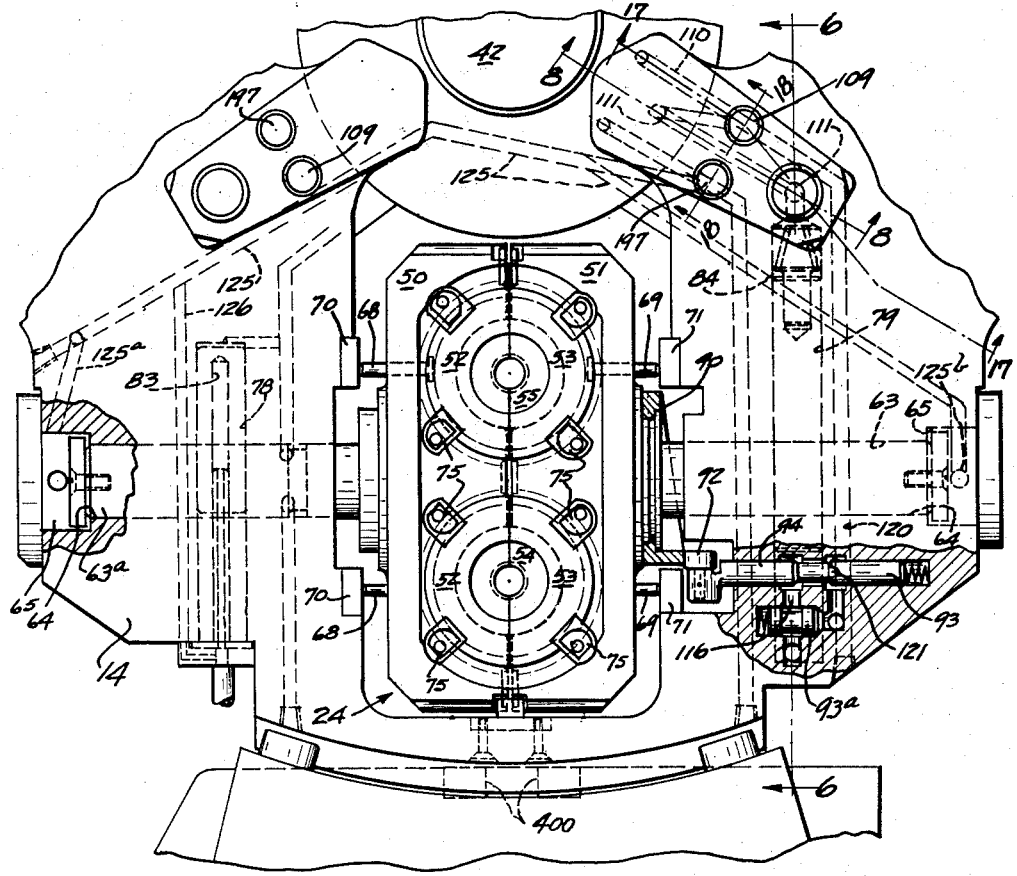
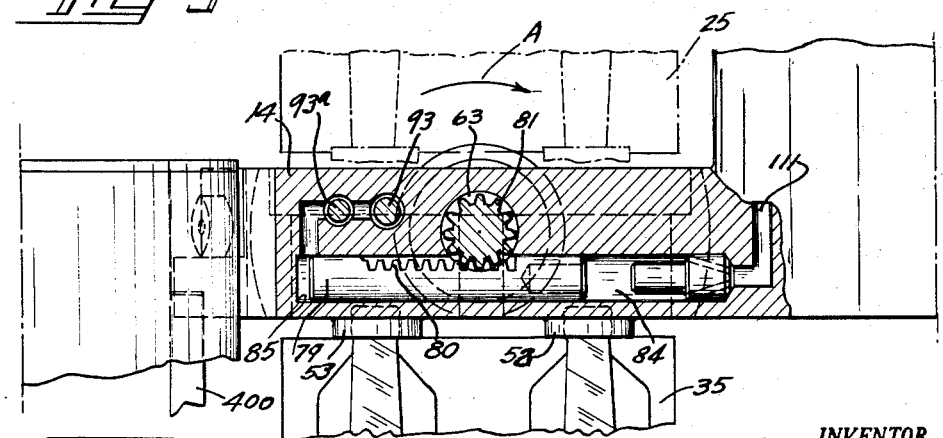

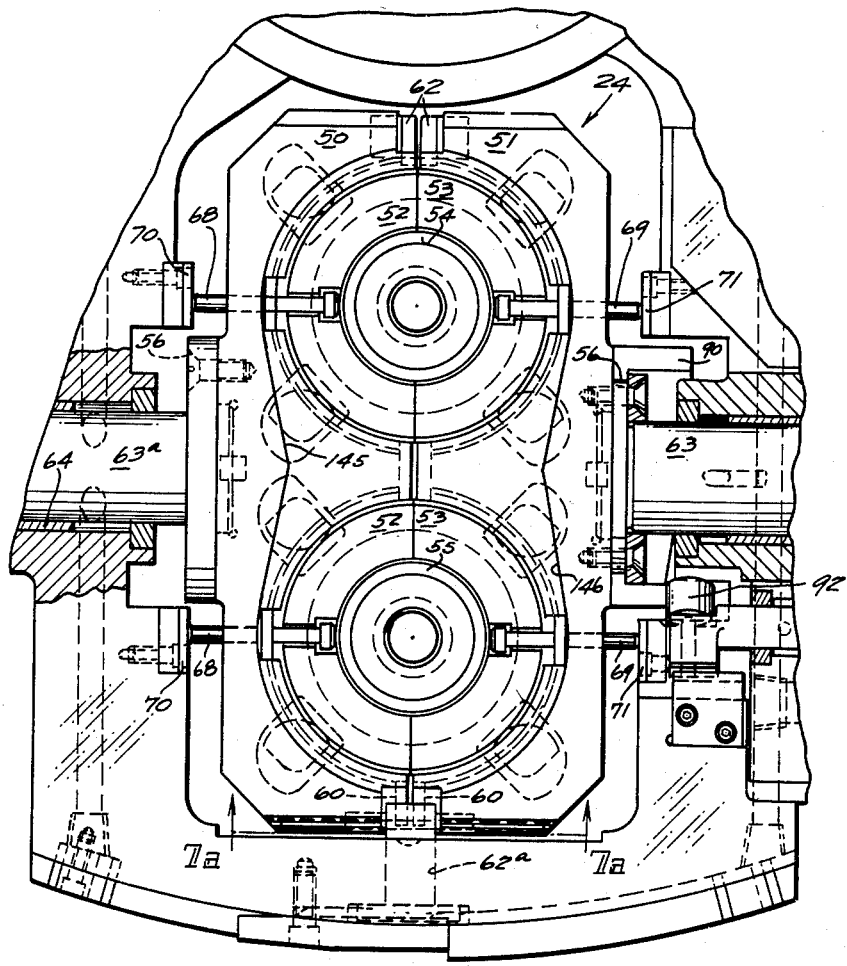
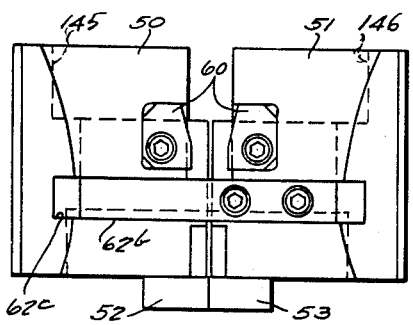
Fig. 7.
Fig. 7a.

ATTORNEYS

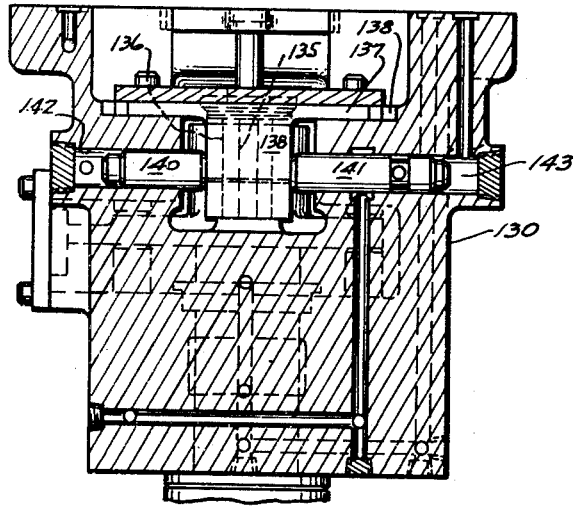
FIG-10
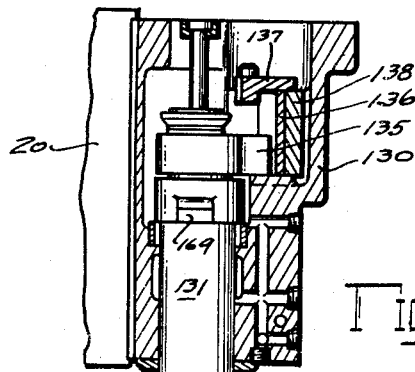
FIG-11
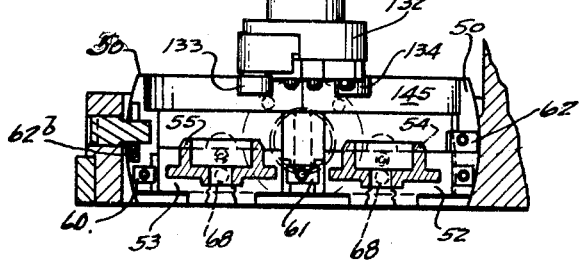

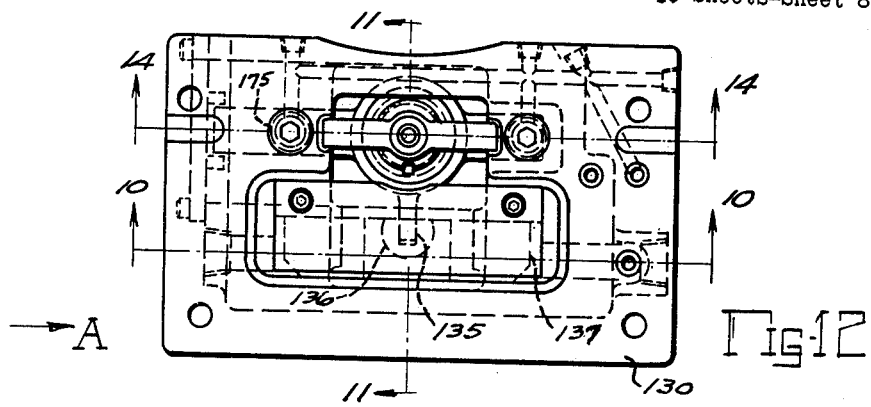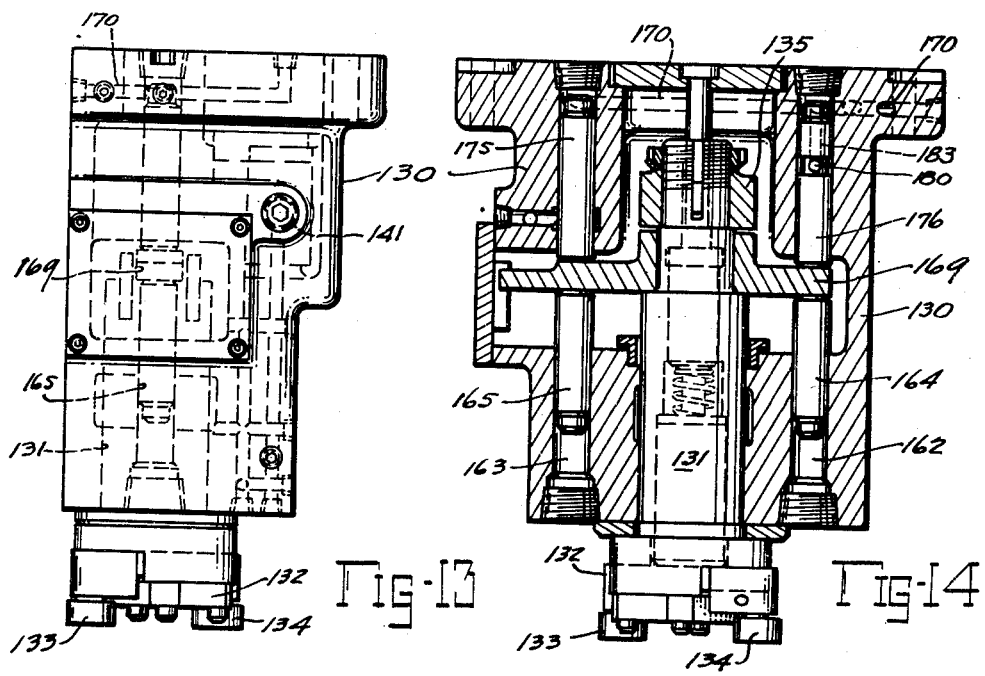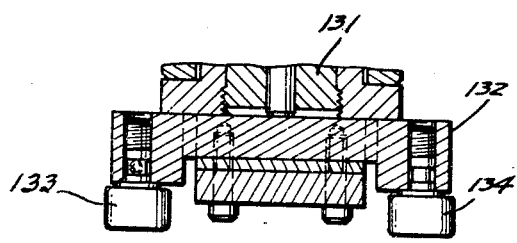

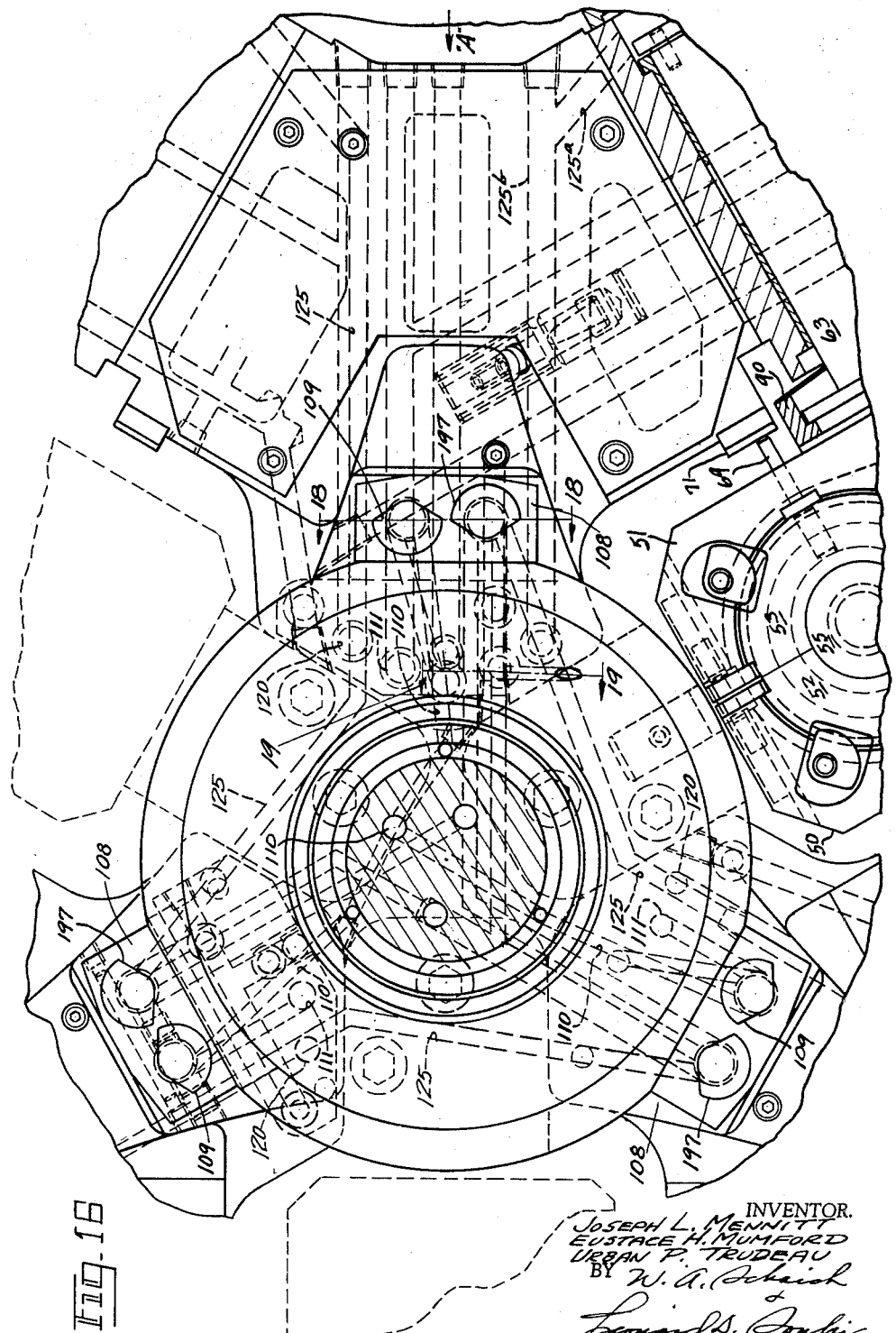

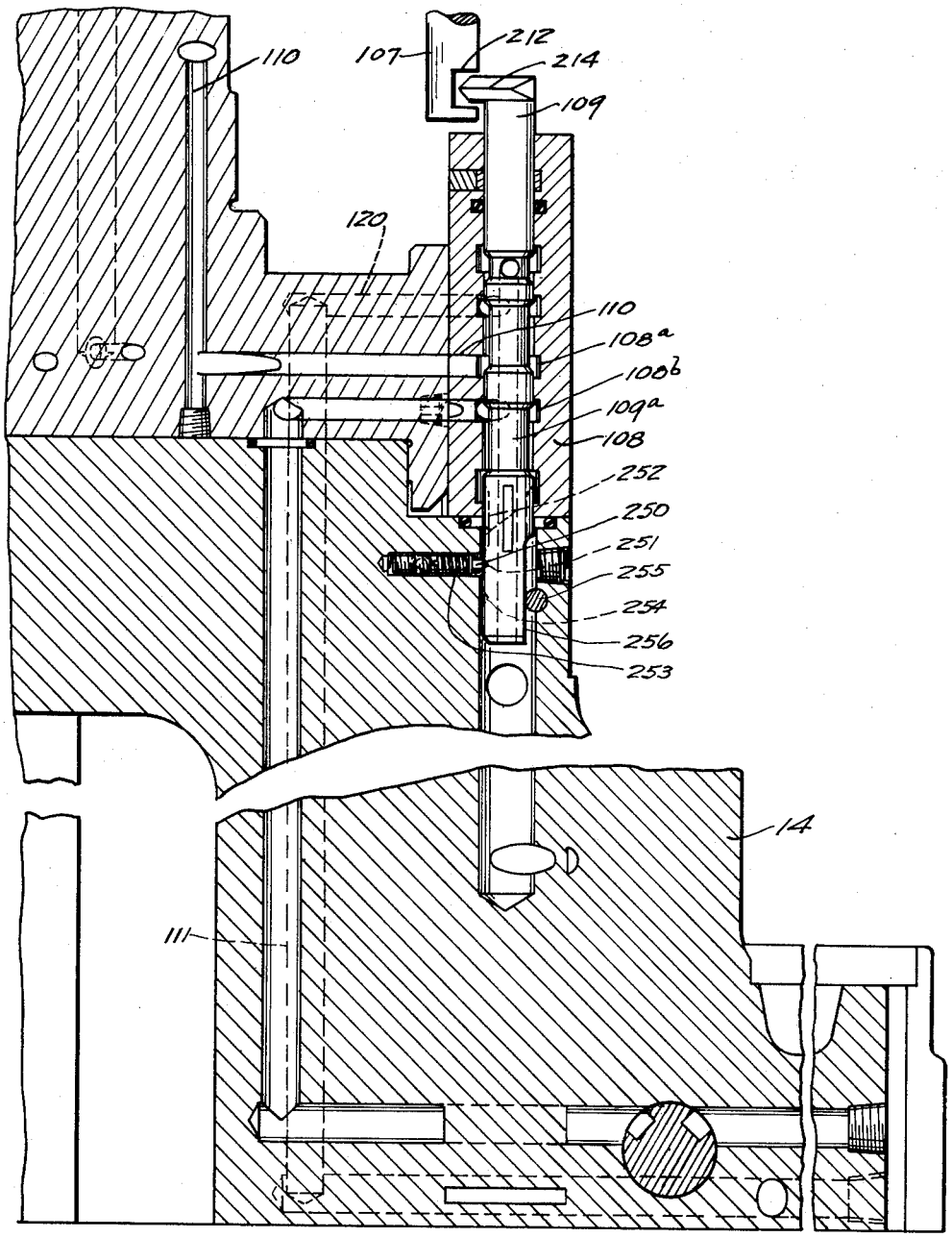

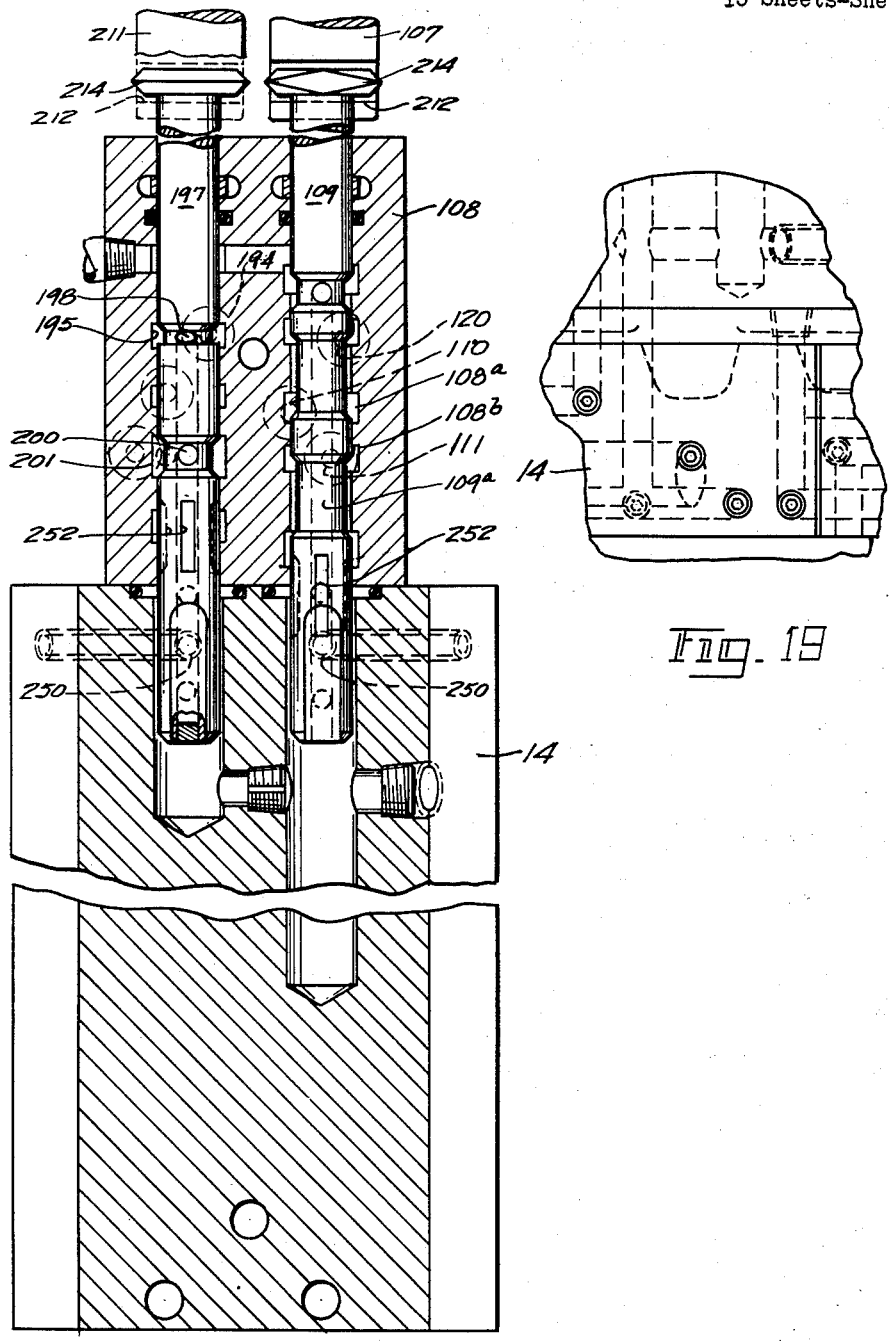

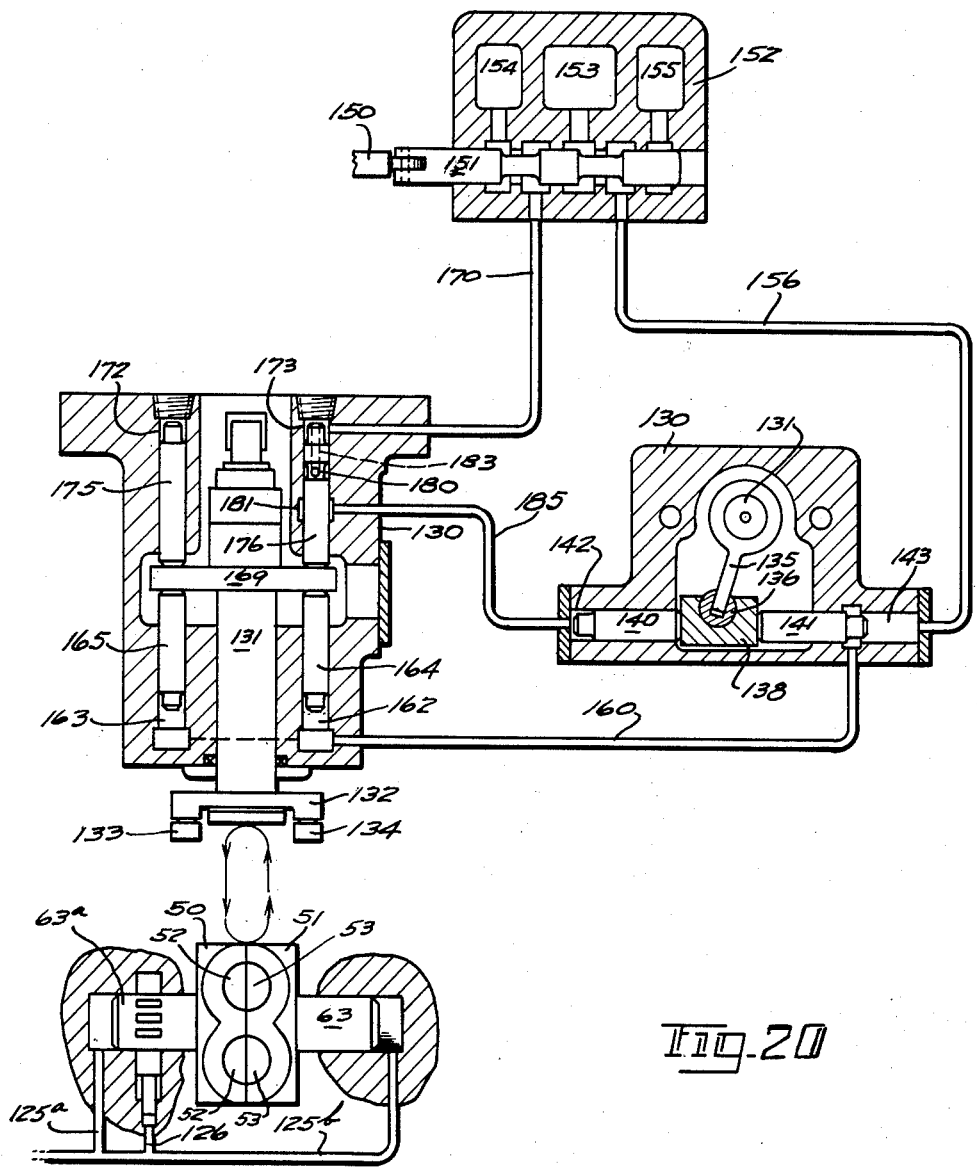

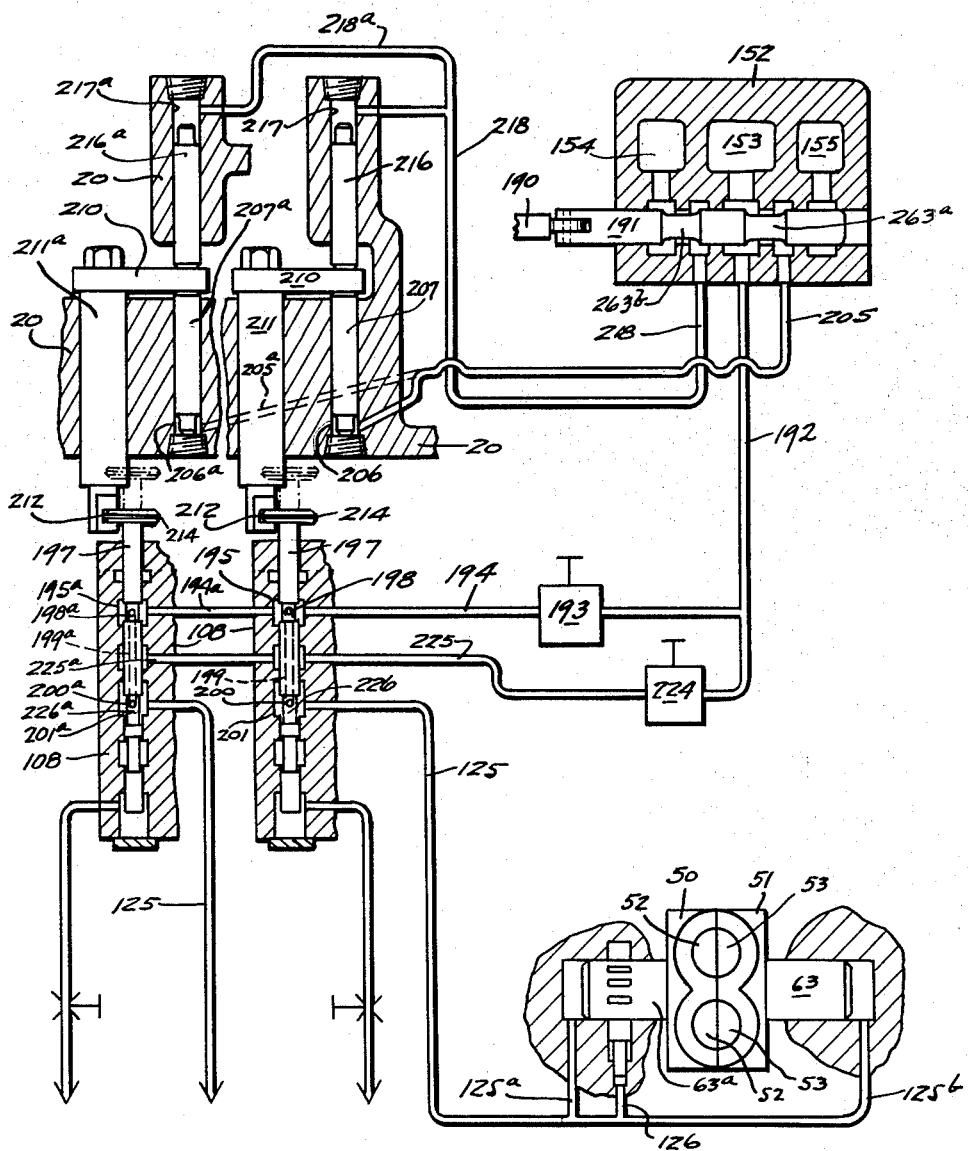

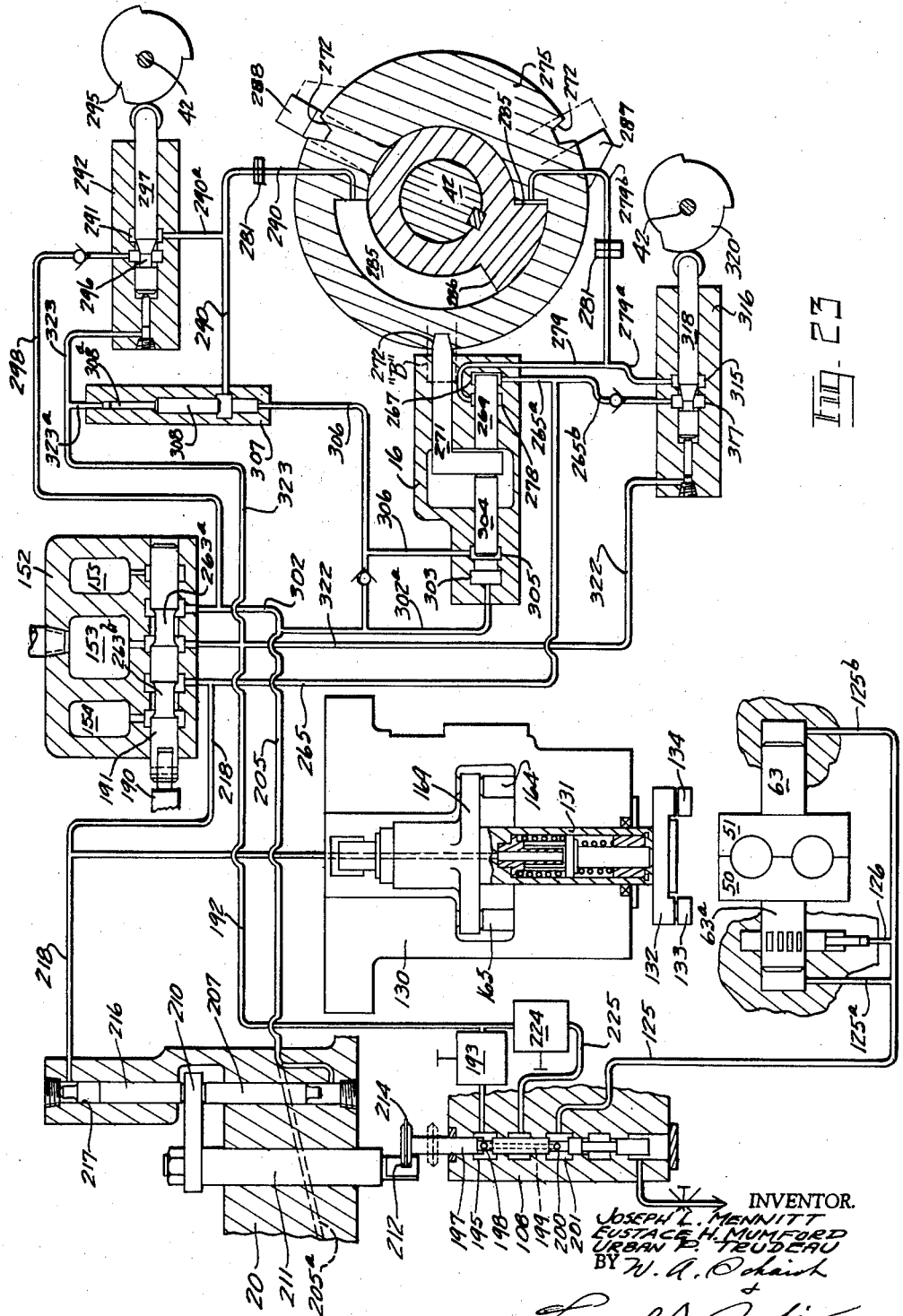

United States Patent Office 3,149,951
Patented Sept. 22, 1964

3,149,951
APPARATUS FOR INVERTING GLASS
FORMING MOLDS
Joseph L. Mennitt, Toledo, Ohio, Eustace H. Mumford, Ottawa Lake, Mich., and Urban P. Trudeau, Toledo, Ohio, assignors to Owens-Illinois Glass Company, a corporation of Ohio
Filed Dec. 14, 1962, Ser. No. 245,368
9 Claims. (Cl. 65—235)

This invention relates to a mechanism for forming hollow glass containers and in particular, the formation of bottles in the range commonly known as narrow neck bottles.

The present mechanism is designed to produce narrow neck ware through the use of either a press and blow method, i.e., the charge of glass is first pressed into a blank and then blown to a hollow article, or the blow and blow method wherein the glass is shaped entirely through the application of air under pressure.

The present mechanical arrangement consists of a plurality of complete bottle forming units spaced from and about the mean vertical axis of a plural gob feeding device. Each said unit comprises a series of forming stations, each station adapted to successively form a plurality of inverted parisons, reverting said plurality of parisons while transferring them to a successive station, blowing said plurality of parisons to final form at said station, delivering a plurality of such blown articles to a third station and performing such operations separately and in timed sequence at each station and on each said unit.

The parison forming stations of these several units are so arranged as to have the plural cavities thereof each approximately equidistant from the mean vertical axis of the feeding device so that the travel of each charge of glass from the feeder to its respective cavity is always identical, thereby presenting a parison of the same temperature at each charging of the mold cavities.

When the charges of molten glass are formed into parisons at the initial forming station, they are formed in inverted position and thereafter they are reverted to normal upright position during their movement to the blowing station. Such reversion is accomplished through a form of toroidal movement of the free ends of said parisons. At the end of the reversion the plural parisons have reached the blowing station where they are blown to final form. The blow mold is then opened and the blown ware, still held by the neck molds, is moved to a take-out station. At the take-out station the blown ware is released from the neck molds and deposited upon a pair of dead plates. As these dead plates receive the ware they are in a position corresponding to the radial alignment of the neck molds. The dead plates are then lowered to a discharge level where they are swung about the center of the outer article to bring both articles into alignment in a plane normal to the radius of the forming table. From this position the pair of blown articles are moved to a ware receiving conveyor by a pair of especially adapted transfer arms.

The particular arrangement of the molding units about the mean vertical axis of a feeding device is such that the ware from each unit is unloaded upon a conveying means interposed between pairs of the forming units so that the ware from each unit is deposited upon a conveying means common to at least two units.

Among the objects of this invention the primary one is the simultaneous high speed production of a plurality of containers by either the press and blow or the blow and blow method.

A further object is the provision of a pressure controllable neck mold mechanism wherein the high pressure pressing and blowing activities will not disturb the position of the neck molds and thus obviate certain deformities in the resultant ware.

A still further object is the provision of inversion mechanism by which the parisons may be inverted in such manner that the usual deformities presented, for example, by the action of centrifugal force is obviated.

Other objects will be in part apparent from this disclosure.

In the drawings:

FIG. 1 is an elevational view of a forming mechanism to which the present neck mold opening and inverting mechanism is applicable;

FIG. 2 is a plan view of such forming mechanism;

FIG. 3 is a part sectional elevation of the rotatable neck mold turret support and the neck mold opening device;

FIG. 4 is a sectional plan view taken at 4—4 on FIG. 3 showing the neck mold opening rollers;

FIG. 5 is a plan view of a portion of the neck mold turret and the neck mold holder illustrating its mounting in the turret and showing the neck molds in upright, parison forming position;

FIG. 6 is a partial section taken at 6—6 on FIG. 5 and illustrates the inverting mechanism for the neck mold holder and shows the neck molds in inverted position;

FIG. 7 is a view looking at the turret and the under side of the neck mold holder showing the neck molds in closed parison forming position; FIG. 7a is a front view of the interconnecting key mechanism between the neck mold holders and is taken at line 7a—7a on FIG. 7;

FIG. 10 is a sectional elevational view taken at line 10—10 on FIG. 12, illustrating the mounting for the neck mold opening mechanism;

FIG. 11 is a sectional elevational view showing the neck mold opening device, its mounting and relationship to the neck mold holders and the section is taken at line 11—11 on FIG. 12;

FIG. 12 is a plan view of the neck mold opening mechanism;

FIG. 13 is an elevational view of the neck mold opening mechanism looking in the direction of the arrow A on FIG. 12;

FIG. 14 is a sectional elevation through the neck mold opening mechanism taken at line 14—14 on FIG. 12;

FIG. 15 is a part-sectional elevational view taken at line 15—15 on FIG. 4 and illustrates the neck mold opening rollers;

FIG. 16 is a plan view of the neck mold supporting turret column illustrating the mounting of the neck mold valve blocks and the fluid passageways thereto;

FIG. 17 is a sectional elevational view taken at line 17—17 on FIG. 5 showing the neck mold inverting and opening and closing valves;

FIG. 18 is a sectional elevational view taken at line 18—18 on FIG. 16 and illustrates the two control valves individual to each neck mold;

FIG. 19 is a view of a portion of the outer surface area of the neck mold turret illustrating the fluid connections to one of the neck mold holders;

FIG. 20 is a schematic view of the fluid control for the neck mold opening rollers;

FIG. 21 is a schematic view of the fluid control for the neck mold closing under high and low pressures;

FIG. 23 is a schematic view of the fluid control for the turret drive and locking devices.

Figure 8:
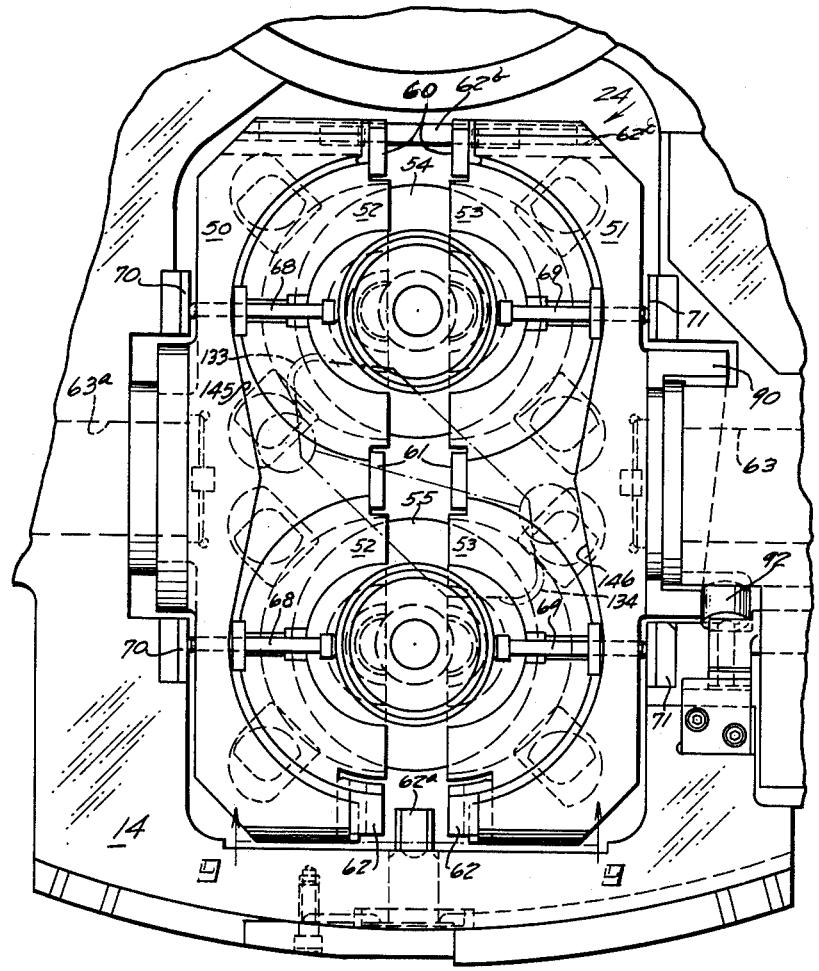
FIG. 8 is a partial plan view of the inverted neck mold holder showing the neck molds in the open position.

Referring to the drawings and in particular to FIGS. 1 and 2, 10 is a base support for a container forming machine upon which is mounted vertically disposed members 11 and 12 arranged to support the frame members 19 and 20. These frame members are adapted to support the neck mold carrying turrets 14, the turret drive 45, and control mechanisms 16 and 17 and a timing cam drum mechanism 18. The timing cam drum mechanism 18 is arranged to control the actuation and the timing of the various container forming mechanisms mounted in a plurality of individual container forming machines 21 and 22. Such mechanisms are pneumatically or hydraulically actuated and controlled by the timer cam mechanism 18. A motor drive unit 23 provides a regulable drive for shaft 29, bevel gears 31 and 32, the vertical shaft 33 and a spur gear 13 mounted thereon and in mesh with a drive gear 13ª on the cam drum 18.

Generally such a container machine may be constituted of two or more complete forming units but for the purpose of describing this present invention the description will, in the major part, be limited to a single unit. Each such forming unit 21 or 22 involves a series of forming stations; for example, station 1 is the parison forming station, station 2 is the blowing station and station 3 is the ware removing or take-out station (FIG. 2). The charges of molten glass are provided by the usual well known feeding device and are initially guided to the immobile parison molds 25 by gob guides 26 which are moved into and out of gob receiving register by a cylinder 27 controlled from cam 18. The gob guides 26 direct the gobs into chutes 28 which carry the gobs to the parison molds 25 (FIG. 1). Each parison mold 25 is mounted upon a stationary column 30 supported on the base 10 at the parison molding station of each forming unit 21 or 22 and each parison mold is adapted to cooperate with its particular neck mold turret 14 and the several neck mold units 24 mounted thereon.

The gobs may be formed into parisons in the parison molds 25 provided at the first station either by pressing or by blowing as may be desired.

A blow mold 35 is also mounted on a stationary column 36 attached to base 10 and supports the blow mold at the blowing station of each forming unit. Each blow mold 35 is also adapted to cooperate with its particular neck mold turret 14 and the several neck mold units 24 mounted thereon.

Blow-heads 37 are provided at the blowing station and are adapted to cooperate with the turret 14 at the blowing station for blowing the parisons to final finished form in the blow molds 35.

At a third station, the finished ware take-out station, mechanisms are provided for removing the finished ware from each forming unit 21 and 22 and transporting it to and positioning same upon a common conveyor 40 (FIGS. 1 and 2).

With the completion of the formation of a parison, the parison molds 25 open and release the parison to the control of the neck mold unit 24. These neck mold units 24 are mounted upon the turret 14 for transfer successively to the several operating or forming stations, namely, the parison forming, blowing and take-out stations (FIGS. 2, 3 and 5).

A hydraulic drive motor 45 is disclosed which forms a part of the hydraulic control unit 16 and is provided for control of the main turret shaft 42 (FIGS. 1 and 2). This provides the driving means for the turret 14, under and through the control of the cam drum mechanism 18, so that the turret 14 may be indexed at the proper time, in the sequence of operations, to thereby bring the neck mold units 24 to the several successive operating stations. The turret 14 is provided with a plurality of neck mold units 24 and is mounted upon a vertical shaft 42 which, in turn, is mounted for rotation in a bracket 43 attached to the machine frame 19 and 20. A rotary valve unit 281 formed as part of the unit 16 provides the fluid connection between the rotary and stationary mechanisms.

The essence of this present invention resides in the novel mechanisms for controlling the neck mold unit 24 both for opening, closing, inverting and transferring same successively to and from the various forming stations.

In particular, this invention is concerned with the mechanisms which prevent the neck molds from being opened during the transfer, the control of their rotative speed during inversion, as well as the provision of a mechanism whereby the neck molds can only be opened when in inverted position (FIGS. 1, 3, 7 and 7ª).

Each neck mold unit 24 is comprised of a pair of oppositely disposed and horizontally movable mold supports or holders 50 and 51. Such disposition of these supports provides inner opposed face portions in each of which is mounted the halves 52 and 53 of the neck forming molds and between which is mounted the thimbles 54 and 55. The halves of the neck forming molds are retained upon the supports 50 and 51 by means of a shoulder 58 and clips 60, 61 and 62. The neck molds 52 and 53 are also retained on the mold supports 50 and 51 by a series of eccentric clips 75 attached to the mold supports and equally spaced around the periphery of these molds. The clips 62 are of a special shape adapted to cause the mold supports 50 and 51 when in closed parison forming position to be properly aligned, in the horizontal plane, by their contact with the aligning pin 62ª. The thimbles 54 and 55 and the neck forming mold halves 52 and 53 are movable radially relative to turret 14, on their supports 50 and 51 in order to accommodate their position to that of the blank or parison mold when cooperating therewith (FIGS. 5 and 7).

Each neck mold support 50 and 51 is provided with a horizontal shaft or piston 63 and 63ª attached thereto as at 56 and mounted in a horizontal bearing 64 formed within the turret 14 (FIGS. 5, 6 and 7). These shafts 63 and 63ª serve also as pistons and are arranged to have fluid under pressure continuously applied to their outer ends as in the chambers 65 to hold the neck molds closed when in all positions except during takeout when the pressure is exhausted. Thus with this structure a pair of opposed pistons is provided which are arranged for actuation only for closing and retaining the neck molds closed. Opposed pins 68 and 69 arranged on the opposite sides of the thimbles 54 and 55 maintain the thimbles on the radial split line between the faces of the molds and against the opening movement of the mold supports 50 and 51. These pins are retained in this predetermined position by the cam plates 70 and 71.

The neck mold supports 50 and 51 are arranged for rotary inversion movement to transfer the parisons in the direction of arrow "A" on FIG. 6 from the inverted position in which they are formed, to their reverted or upright position for final blowing (FIGS. 5 and 6). An example of the manner of inverting the parisons is shown in FIG. 1 of copending application Ser. No. 534,265, filed September 14, 1955, now U.S. Pat. No. 2,949,701, dated August 23, 1960. This patent illustrates that the inversion of the parisons is toward the axis of rotation of the turret. During this inversion a fluid pressure of high degree will be maintained upon the ends of the shafts or pistons 63 and 63ª and will maintain the neck mold supports 50 and 51 and their respective neck molds 52 and 53 in closed position. When the inversion is completed the ends of the pins 68 and 69 will be in contact with cams 70 and 71, thus holding the thimbles 54 and 55 on the radial center line of the mold supports (see FIG. 8) and without interfering with the movement of any other member of the neck mold unit.

The rotation or inversion of the neck mold supports 50 and 51 is accomplished through the hydraulically actuated pistons 78 and 79 (FIG. 5) which are provided with rack teeth as at 80, meshing with teeth 81, formed on the pistons 63 and 63ª. The pistons 78 and 79 are mounted in chambers 83 and 84 formed in the turret 14 and are arranged to receive fluid under pressure from a controlling valve system timed from the main cam drum 18.

Figure 22:
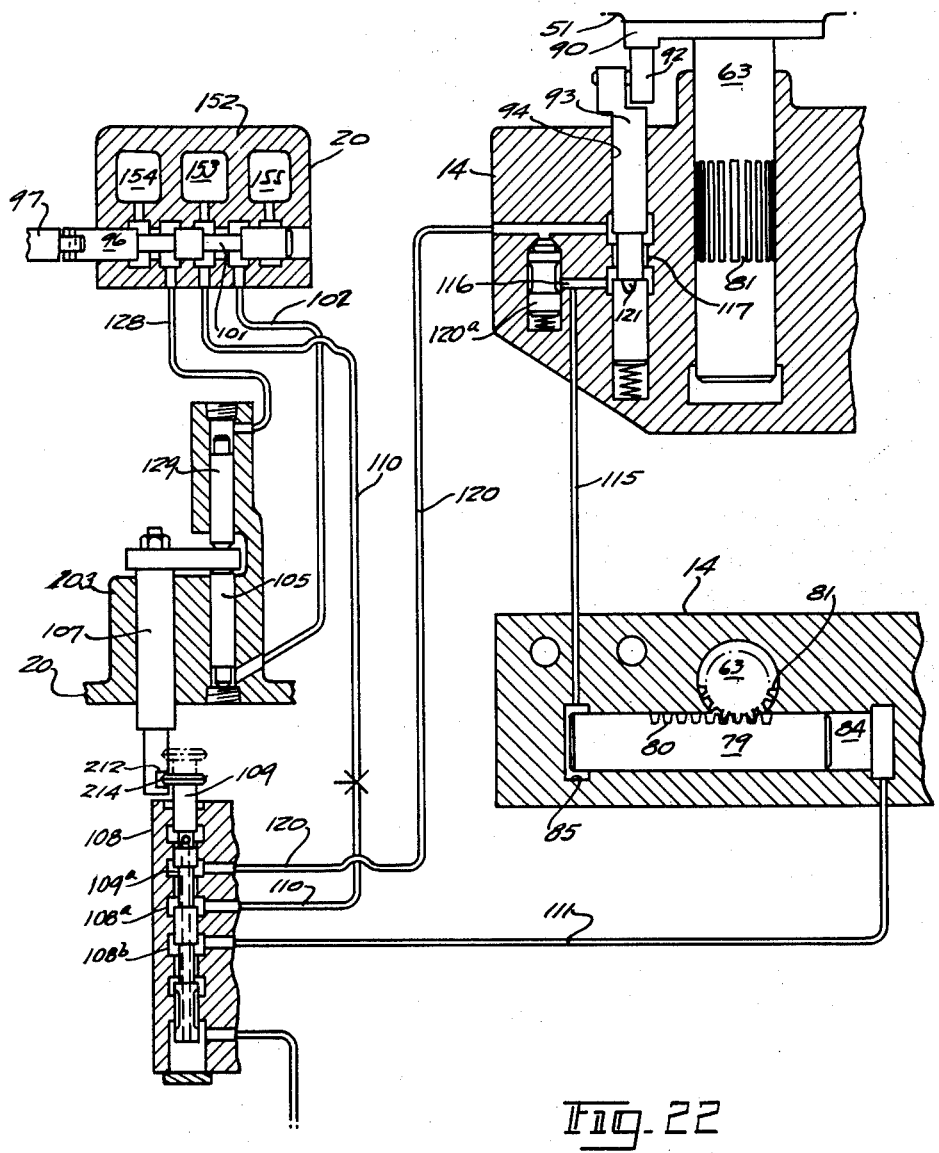
FIG. 22 is a schematic view of the fluid control for the neck mold inversion.

The speed of rotation of the neck mold supports 50 and 51 is controlled during the inversion by means of a cam 90 mounted on the support 51 and rotatable therewith (FIGS. 5, 7 and 8). In combination with this cam 90 and in contact with its cam control surface is a roller 92 formed as a part of the slide valve 93. The valve 93 is mounted in the horizontal chamber 94 formed in turret 14 and arranged to control the rate of flow of fluid from the end 85 of chamber 84 in advance of piston 79 (FIG. 22).

The main control and actuation of the inversion or reversion of the neck molds and their parisons reside in the cam drum 18 which is a continuously rotating drum carrying a plurality of cams (FIG. 1), each of which is common to all of the forming units. A series of slide valves, similar to valve 96, are mounted on the frame 20 and positioned in such manner as to be in contact with specific individual cams, similar to cam 97, formed on the drum 18. In this particular instance, the control of the inversion, we will refer to the valve 96 under control of the cam 97 as shown in FIG. 1 and FIG. 22.

The parison reversion or transfer occurs in these forming units as the neck mold forming unit is moved by and with the turret 14, from the parison forming or pressing station #1 to the blowing station #2 (FIGS. 1, 2 and 3). Just before the turret 14 starts its index motion to move a neck mold unit from the blank forming station, the valve 96 is actuated by the cam 97 (see FIGS. 1 and 22), permitting fluid under pressure to leave the pressure chamber 153 through recess 101 of the valve 96 to conduit 102 and enter beneath a piston 105 mounted in a cylinder block 103 formed in the upper support frame 20. A cylinder block 103 is provided at each operating station. Pressure under the piston 105 moves the valve lifter stem 107 upwardly. A valve 109 is mounted in each of the valve blocks 108 of which there are three and which are formed on the turret 14 at each of its three neck mold positions. Valve lifters 107 are provided at the parison forming station (station 1) and at the takeout station (station 3). Each valve lifter is provided at its lower end with a contact slot 212 arranged to receive the head 214 of the valves 109 as they reach each successive station. Lifting of the valve 109 from the position shown in FIGS. 17 and 22 will permit the passage of fluid through the valve recess 108ᵇ into conduit 111 and into the chamber 84 behind the piston 79. With this pressure applied behind the piston 79, the teeth 80 in mesh with the teeth 81 on piston 63, will cause the piston 63 to rotate about its horizontal axis, thus inverting the neck molds and carrying the parisons therewith. The timing here is such that the inversion will begin just subsequent to the beginning of the index movement of the turret 14 and be completed at any desired time up to the completion of the indexing movement between stations 1 and 2.

As the neck mold supports 50 and 51 invert (FIGS. 5, 6, 7 and 22), the cam 90 rotates therewith and actuates the valve 93 in such manner as to control the rate of exhaust of fluid through lines 115, 116 into the chamber 117 and through the exhaust line 120. The exhaust of this fluid past the valve 93 is obtained by the feathered portion 121 provided on this valve. The control cam 90 may be contoured to give any desired type of control of the rate of inversion and may be adjusted circumferentially about the axis of rotation to regulate the point of control actuation.

At the same time that fluid is flowing through conduit 111 to invert the neck molds, fluid is also passing through conduits 125 and 126 (FIG. 21) into the chamber 83 (FIG. 5) formed in the piston 78. This piston 78 is provided with teeth 80 meshing with teeth 81 formed on the piston 63ª in a manner similar to that described above with respect to pistons 63 and 79. Thus with fluid under pressure in conduits 125 and 126, the movement of piston 79 will be resisted by the piston 78 during the inversion of the neck mold holders 50 and 51 to the position shown in FIG. 5. A key 62ᵇ is attached to the neck mold holder 51 and extends into a slot 62ᶜ formed in the corresponding end of holder 50, thus locking these two holders against rotation relative to each other but permitting the holders to open and close (FIG. 7ª).

In order to control the characteristics of the inversion, such as the elimination of back-lash at the end of the inversion strokes, the piston 79 is provided with and presents a greater surface area to the fluid pressure than does the piston 78 (FIGS. 5 and 6). In the piston 78 the application of the pressure is to the surface area of the chamber 83 which is considerably smaller in area than the end of the piston 79. Because of this difference in areas, the piston 78 is in reality opposing the inversion movement through the application of the pressure upon this greatly decreased area and thus prevents the occurrence of any whip or backlash during the inversion movement of the neck molds and also prevents lost-motion in the gearing.

With the neck molds inverted and the parisons pendent therefrom at station #2 (FIG. 6), the blow molds 35 will be closed about the parisons and the blow-heads 37 under control of a cam on drum 18 will be positioned over the neck molds to blow the parisons to final form in the blow molds. The blow-head 37 may be one of any of the well known blow-heads such as disclosed in the patent to Conrad et al., 2,837,871, June 10, 1958.

During the period when the blow mold and the parison mold are being closed with respect to the neck molds, the valves 197 (FIG. 21) which are positioned at the blow station and pressing station are shifted to the position shown in dotted lines on FIG. 21. With these valves in this position relatively low pressure fluid will be fed to the ends of the pistons 63 and 63ª. This pressure is sufficient to hold the neck molds closed but allows the neck molds to shift slightly into precise alignment with respect to the parison mold and blow mold. When the blow mold and parison mold have both closed, the valves 197 will be shifted to the position shown in full lines on FIG. 21 resulting in the application of high pressure fluid to the pistons 63 and 63ª. This pressure will hold the neck molds closed against the forming pressures being applied thereto during the pressing of the parisons or the expansion of the parisons at the blow station. At the completion of the formative stations of the parisons, the valve lifters 211 will remain inactive and the valves 197 will remain in the position shown in full lines on FIG. 21.

Indexing of the turret will carry the valves 197 to the next station where the valve lifters positioned at the next station will be in position to receive the ends 214 thereof. This high pressure is continuously maintained on the pistons 63 and 63ª during the entire forming cycle with the exception of the time when the parison or blow molds are being closed about the neck molds and when the neck molds are positioned at the takeout station. The high pressure source is cut off entirely from the pistons at which time the neck molds are opened and the pressure fluid is allowed to exhaust at a controlled rate from the pistons 63 and 63ª.

The positioning of valve 197 to exhaust the pressure fluid from the pistons is illustrated in dotted line on FIG. 23. The position shown in full line on FIG. 23 is the same as the position shown on FIG. 21 for this valve 197. With the completion of the shaping and blowing of the parison at these two stations, the valve lifters 107 at stations 1 and 3 are activated to move the valves 109 which are then positioned at these two stations to positions where the neck mold unit 24, as it leaves station 1, will invert during the indexing and the neck mold unit 24 leaving station 3 will revert during the indexing of the turret 14. This inversion and reversion will always happen during movement of these units as they are moved between stations 1 and 2 and stations 3 and 1.

Thus it should be apparent that the valve 109 when at station 2 remains inactive and, in fact, there is no lifter for this valve at station 2.

With the completion of the blowing operation the blow molds are opened, the turret 14 indexes under control of cam 190 and valve 191 (FIG. 23) carrying the bare blown articles pendant from the neck molds to the take-out station where a receiving device 127 is arranged to receive the ware.

When the neck molds and their blown ware reach the take-out station they are brought to rest beneath a neck mold opening mechanism mounted on and attached to the frame support 20 as shown in FIGS. 3 and 20. This neck mold opening unit is comprised of a head 130 mounted on the upper frame support 20 and has mounted therein a vertical shaft 131 carrying at its lower end a head or bar 132 upon which is mounted a pair of horizontally opposed rollers 133 and 134. The upper end of the shaft 131 is provided with a tongue member 135 which extends horizontally outward from this vertical shaft and on its vertical center line. This tongue 135 is in mesh with a vertically disposed cylindrical member 136 formed pendant from a horizontal slide 137 and adapted for rotary motion about a vertical axis in a vertically pendant portion 138 of the slide 137 (FIGS. 11 and 12).

A pair of horizontally opposed pistons 140 and 141 (FIGS. 10–15) are mounted in the head 130 and positioned on opposite sides of and in contact with the pendant portion 138 of the slide 137. These pistons are arranged to have hydraulic fluid brought into their chambers 142 and 143 under control of a cam 150 for the purpose of moving these pistons simultaneously in the same direction, thus moving the cylindrical member 136 in a horizontal direction and through the inter-connection with the shaft 131, by means of the tongue 135, the head 132 and its rollers 133 and 134 will be rotated about the vertical center line of the shaft 131.

The neck molds which are normally held closed by a constantly applied high pressure are at the take-out station under the control of the main cam drum 18 and specifically under control of cam 150 and valve 151. By referring to FIG. 20 it will be noted that the valve box 152 is provided with a main pressure chamber 153 and exhaust chambers 154 and 155. With the parts in the positions shown in FIG. 20 the valve 151 permits pressure from the chamber 153 to enter through conduit 156 behind the piston 141 maintaining the neck mold opening rollers in an inoperative position. Pressure is also permitted to pass through the chamber 143 through conduit 160 into the chambers 162 and 163 formed in the head 130 and beneath pistons 164 and 165. These pistons 164 and 165 are positioned beneath a flange 169 formed or attached to the shaft 131. This pressure through conduit 160 maintains the cam rollers 133 and 134 in raised or inoperative position.

When the turret 14 brings the neck molds 52 and 53 to the take-out station the cam 150 shifts the valve 151 to permit pressure from the pressure chamber 153 to flow through the conduit 170 into the chambers 172 and 173 formed in the block or head 130 and over the pistons 175 and 176. These pistons are above and in physical contact with the flange 169 of the vertical shaft 131 and with the admission of pressure through conduit 170, the pistons are forced downwardly, applying pressure to the flange and moving the head 132 with its cam rollers 133 and 134 downwardly into the position shown in FIG. 11. In this position the cam rollers 133 and 134 are in a horizontal plane parallel to and permitting them to be brought into contact with the cam surfaces 145 and 146 formed in a single plane and within the upper longitudinal surface of the neck mold holders 50 and 51. As the cam rollers 133 and 134 reach their lower position in the plane of the neck mold opening cam surfaces 145 and 146, an opening 180, formed in the piston 176, is brought into alignment with a chamber 181 (see FIG. 20), thus permitting the pressure from conduit 170 to pass through the conduit 183 in piston 176, through the opening 180 into the chamber 181 and through conduit 185 into the chamber 142 formed in the head 130. This applies pressure behind the piston 140 and moves the block 138 horizontally and through its rotary connection 136 between the tongue 135 and the shaft 131, said shaft is rotated about its vertical axis, thus moving the cam rollers 133 and 134 into contact with the cams 145 and 146. This will bring these rollers into rolling contact with the cam surfaces 145 and 146 respectively formed in the upper face of the mold supports 50 and 51. As can best be seen when viewing FIG. 15, the head 132 of the mold opening mechanism is provided with a pair of rollers 133 and 134 connected to the undersurface thereof. This head 132 is shiftable with respect to its supporting shaft 131 so that when the rollers 133 and 134 make contact with the cam surfaces 145 and 146 within the mold supports 50 and 51, the head 132, by reason of its ability to shift, will insure that the two cams 133 and 134 will both be applying opening force against the mold supports 50 and 51. This shifting of the head 132 takes place automatically by reason of the fact that the mold supports 50 and 51 are maintained closed under high pressure a sufficient length of time after the valve 151 (FIG. 20) has been shifted. This means that the pistons 140 and 141 of the opening mechanism, while being under pressure to rotate the head 132, present insufficient force to accomplish this rotation against the high pressure, which is maintained on the pistons 63 and 63ª of the mold supports 50 and 51.

Thus it can be seen that the hydraulic motor for rotating the mold opening mechanism is, in effect, stalled until the valve 197 is shifted to the dotted line position illustrated on FIG. 23. Keeping in mind the fact that the rollers 133 and 134 are being held against the cam surfaces carried by the mold supports 50 and 51, shifting of the main valve 191 by the cam 190 to the left as viewed in FIG. 23 will result in the application of fluid under pressure to the line 218 which opens into the chamber 217 above the piston 216 of the valve shifting mechanism 211. This application of fluid under pressure to the piston 216 will result in shifting the valve 197 from the position shown in full lines to the position shown in dotted lines on FIG. 23. At the same time a branch line leading from the line 218 will actuate a locking pin carried within the shaft 131. The locking pin will engage the upper surface of the head 132 and lock it in its assumed position. Fluid under pressure which up to this time has been maintained on the pistons 63 and 63ª, will be exhausted through an opening provided in the bottom portion of the valve block 108. This exhaust of fluid pressure from the pistons 63 and 63ª will allow the piston 140, block 138 and its connecting link to the shaft 131 to move and result in opening the neck mold supports 50 and 51. Thus the mold supports will be forced apart and open the neck molds 52 and 53 and release the blown article or bottle to a receiving member 127.

The cam 150 then reverses the position of the valve 151, thereby reversing the flow of the fluid through conduits 156 and 170 and returns the several parts to the position shown in FIG. 20, thus bringing the cam rollers 133 and 134 to an inoperative position with respect to cams 145 and 146 preparatory to opening the next set of neck molds 52 and 53.

Concurrent with the shifting of the neck molds (FIG. 22) from the take-out station, the cam 97 will have shifted the valve 96, causing pressure fluid to enter into conduit 128 behind a piston 129 and the conduit 102 will exhaust to chamber 155. This pressure to conduit 128 will move the valve lifter 107 downwardly and cause the valve 109 to take the position shown in FIG. 22, thus permitting fluid under pressure from conduit 110 to flow into conduit 120 thence through the check valve 120ᵃ into conduits 116 and 115 leading to the end 85 of chamber 84 and behind the piston 79, thus reverting the neck molds to a position preparatory to the formation of the next parison.

At the time that the above described neck mold operation is occurring at the take-out station, other operations with respect to the other neck molds are occurring at the blank or parison forming station and also at the parison blowing station respectively. For example, at the blank or parison forming station, the neck molds are in closed position and remain closed under the applied low pressure medium in order to thereby permit the parison molds 25 to close around the neck molds and to center or come into alignment with respect to each other.

In any of the usual glass forming machines the parison is formed by means of the application of a pressure of some form, either pneumatic or mechanical, a blowing pressure or a pressing plunger under pressure. In any event, the pressure applied to form or press the parison always tends to open the neck molds, thus inducing the formation of a fin along the sides of the neck of the parison which is highly detrimental to otherwise acceptable ware. In order to obviate this condition a mechanism has been provided whereby during the formation of the parison extremely high closing pressures may be applied to the neck molds to present them from opening under the application of the distorting forming pressure.

This application of high pressure simultaneously occurs at both the pressing station and blowing station and continues to be applied at these stations during the pressing of the parison and the expansion of the parison to final form at the blowing station.

In FIG. 21 the valves 197 in valve blocks 108 at stations 1 and 2 are shown diagrammatically as arranged for simultaneous operation wherein one valve lifter 211 will be positioned at the pressing station and the second valve lifter 211 will be positioned at the blowing station. In this manner this pair of valves 197 may be simultaneously operated in order to control the application of high pressure to the neck molds at separate operating or forming stations.

Referring to FIG. 21 it will be noted that the valve 191 has no control over the application of a high pressure fluid from the pressure chamber 153 to the conduit 192. The conduit 192 is connected through a high pressure regulator 193 to a conduit 194 leading into a chamber 195 formed in a valve block 108. There is a valve block 108 provided for each of the three neck molds and the application of this high pressure to the valve blocks 108 occurs simultaneously at both the pressing and blowing stations as well as the take-out station illustrated in FIG. 23. Consequently this high pressure continues through line 194ᵃ to valve block 108 at the blowing station and enters into chamber 195ᵃ. Valve stems 197 mounted in each of the valve blocks 108 are so positioned that the high pressure flows through openings 198 and 198ᵃ through channels 199 and 199ᵃ in valves 197 and out through openings 200 and 200ᵃ into chambers 201 and 201ᵃ in the valve blocks 108. Thence this pressure flows from this chamber through conduits 125, 125ᵃ and 125ᵇ to the neck molds at both stations and behind the pistons 63 and 63ᵃ in the turret 14 to hold the neck mold holders 50 and 51 in their closed position and under this high pressure.

At two of the three stations, namely, the parison pressing and article take-out stations, there is provided a plural valve lifting mechanism so mounted as to remain at these stations, which are identical in structure and which are common to all neck mold heads or units. There is only one difference in any portion of this structure (FIGS. 16 and 18) and this is the fact that the heads 214 of the valve stems 109 and 197 are reversed with respect to each other and the slots 212 in each of the members 211 are also reversed to correspond to the heads 214 of the valve stems 109 and 197 (FIGS. 1, 2, 3, 16–18, 21–23).

With the completion of the formation of the parison in the parison mold and the blowing of the previous parison to final form the turret 14 is indexed, bringing the succeeding parison to the blow mold station where it is enclosed in the blow mold 35 (FIGS. 21–23). At this time the cam 190 causes the shifting of the valve 191 to provide pressure from chamber 153 through recess 263ᵃ to conduits 205 and 205ᵃ into chambers 206 and 206ᵃ formed in the frame member 20 and beneath the pistons 207 and 207ᵃ. These pistons are beneath and in contact with arms 210 attached to the valve lifters 211, the lower end of each being provided with a groove 212 adapted for contact with a head 214 formed on the upper end of each valve stem 197. This pressure through conduits 205 and 205ᵃ causes the pistons 207 and 207ᵃ to move upwardly carrying the valve lifters 211 and raising the valves 197 to the dotted line position shown in FIG. 21. This movement causes the pistons 216 and 216ᵃ above and in contact with the arms 210 to move upwardly, forcing the fluid in the chambers 217 and 217ᵃ to move outwardly through conduits 218 and 218ᵃ and to exhaust through the exhaust chamber 154 formed in the valve block 152.

In this described manner this high pressure is supplied to one set of neck molds while they are at the parison pressing station and simultaneous therewith this high pressure is also supplied to a second set of neck molds at the next succeeding or blowing station.

The third set of neck molds is at the take-out station and as the valves 197 are successively presented at this station (FIG. 23) they are brought into contact with a valve lifter 211 and the reversal of slide valve 191 by main cam 190 causes the valves 197 to be lowered to discontinue the high pressure upon the neck molds and exhaust the pressure therefrom. Thus the shifting of stem 197 stops the flow of constant pressure fluid from the conduit 192 into the conduits 125ᵃ and 125ᵇ and fluid present behind the pistons 63 and 63ᵃ.

The valve stems 197 and 109 are retained in whatever position they have attained from the lifters 211 or 107 by means of a friction pin 250 held in notches 251, and 254 by means of a spring 253 (FIG. 17). Thus as the turret 14 is indexed from one station to another the valve stems 109 and 197 remain in their attained positions during such movement. A pin 255 cooperates with a flattened portion 256 on each of the valve stems 109 and 197 to retain them in a certain position oriented about their vertical axis. Each valve stem has an extending head 214 adapted to cooperate with corresponding slots 212 formed in the valve lifter fingers 107 and 211. There are two of the valve lifters 107 provided for the control of the inversion and reversion of the neck molds which are inverted between stations 1 and 2 and reverted between station #3 and station #1. The valve lifter 107 will move the stem 109 upwardly from the position shown in FIG. 17 to bring the pressure conduit 110 and chamber 108ᵃ into communication with chamber 108ᵇ through channel 109ᵃ on stem 109 and through conduit 111 to chamber 84 behind the piston rack 79 in turret 14 (FIG. 22). This action or movement of the valve stem 109 occurs just as the turret 14 is about to index in order that the reversion will occur during the index movement and be completed by the time the neck molds reach the loading or #1 station. As the neck molds reach station #1 the head 214 of stem 109 moves into the slot 212 of the lifter 107 located at that station. With the completion of the formation of the parison at station #1, the table or turret 14 is indexed under control of the valve 191 and the cam 190 formed as a part of the main cam drum 18.

The drive for the indexing of the turret 14 is a fluid drive type and as shown in FIG. 23, the turret 14 has just completed its indexing movement, the driving parts are at rest, and the locking detent 400 (FIG. 5) has moved into the locking position as shown, thus maintaining the turret in locked registered relationship with the several forming stations.

The valve 191 is now moved by cam 190 (FIG. 23), shifting the valve to permit pressure fluid to flow through recess 263$^b$ into the conduit 265 and 265$^a$, to chamber 267, formed in the drive support 16 and beneath the piston 269. This pressure moves the piston 269 to withdraw the drive case locking detent 271 from the groove 272, thus freeing the drive case 275 for rotation. As the locking detent 271 continues to move, it permits fluid to flow through chamber 278 into conduits 279, 279$^a$ and 279$^b$. A pair of rotary valves 281 formed in the slip joint 45 permits rotation of the drive parts relative to the source of fluid supply.

As the fluid flows into and through conduit 279$^b$ it enters into one end of a chamber 285 behind a piston 286, which is keyed to turret shaft 42, and causes the drive case 275 to rotate in a counter-clockwise direction until projection 287 contacts the stop 288. The stop 288 is formed integral with and is an extension part of the piston member 286 and moves with the turret 14 and turret shaft 42. The relative motion as between case 275 and piston 286 causes the fluid in chamber 285 to flow or exhaust through conduit 290, rotary valve 281 and line 290$^a$ to chamber 291 formed in a valve block 292. The cam 295 will, during this rotation, move the valve 297 so that recess 296 will bring the chamber 291 in valve block 292 into communication with exhaust line 298, in such manner that the rate of exhaust flow of fluid into exhaust line 298 will be controlled and thus control the speed of rotary movement of the case 275. The valve 191 will permit the fluid in line 298 to exhaust, through recess 263$^a$, into exhaust chamber 155 in valve box 152.

These previously described operations will leave the drive parts in position for the next indexing of the turret 14 and to accomplish this the valve 191 will be placed in the position shown in FIG. 23 by the cam 190 and will allow pressure fluid to flow through recess 263$^a$ into conduit 302 and 302$^a$, chamber 303 in the valve support 16 and behind the piston 304. This will cause the detent 271 to be moved into recess 272 to lock the case 275 against rotation. The movement of piston 304 opens chamber 305 and allows fluid to flow through conduit 306 to valve block 307, forcing the time delay piston 308 into the position shown in FIG. 23 and permitting flow of fluid to conduit 290, rotary valve 281 and into chamber 285. The small end 308$^a$ of piston 308 is working against a fluid pressure, but its small area permits it to be slowly moved to the open position shown. This delay permits the case 275 to be locked by the detent 271 prior to the entrance of pressure fluid into chamber 285. During this time delay the detent 400 (FIGS. 5 and 6) is retracted from the locking position shown in FIG. 6, by any well known means, such as a fluid cylinder and piston (not shown) thus freeing the turret 14 for rotation.

At this time the relative position of the piston portion 286 and chamber 285 is exactly the opposite that shown in FIG. 23 and consequently the entry of fluid through conduit 290 into chamber 285 will cause the piston 286 to move, relative to the locked casing 275, into the same relative positions shown, thus indexing the turret 14, bringing a neck mold to a succeeding station and moving the stop 288 to the dotted line position "B" on FIG. 23.

The indexing of the turret 14 together with the movement of piston 286 provides a situation wherein the piston 286 is moving in chamber 285 with fluid exhausting through conduit 279$^b$ and 279$^a$ (FIG. 23). This fluid flows into chamber 315 in valve block 316 and thence through chamber 317 to exhaust through conduits 265$^b$ and 265 to the exhaust chamber 154 of the valve block 152. The passage of fluid from chamber 315 to chamber 317 is regulated by a valve stem 318 controlled by a cam 320 on the turret shaft 42. This regulation permits the rotative speed of the turret 14 to be controlled during the indexing thereof.

Constant pressure is supplied through conduits 322, 323 and 323$^a$ for the purpose of maintaining the valve stems 297 and 318 in physical contact with the control cams 295 and 320 and to provide the time delay pressure behind the valve stem 308 of the delay valve 307 (FIG. 23). From the preceding description it should be apparent that this indexing operation requires that the stop finger 288 and table 14 be indexed 120° and then the casing 275 and its stop 287 is indexed 120° to catch up with the table 14 and stop 288. This operation occurs in repeated succession.

Simultaneous with the provision of pressure to line 302, pressure is also provided to conduit 205 and 205$^a$ (see FIG. 21) beneath pistons 207 and 207$^a$ in the support 20, thereby shifting the valve lifters 211 and raising both valve stems 197 that are associated with the neck molds located at the press and blow stations. This movement of valves 197 will supply low pressure from the low pressure control 224 through conduits 225 and 125 to the back of pistons 63 and 63$^a$ to maintain the neck molds closed at stations 1 and 2 under low pressure. As soon as the blank molds 25 and blow molds 35 close, or concurrently therewith, the valves 197 are shifted to bring high pressure fluid from the high pressure valve control 193, through chamber 195, conduit 199, chamber 201 to conduits 125, 125$^a$ and 125$^b$ behind pistons 63 and 63$^a$ to hold the neck molds 50 and 51 closed under a pressure sufficiently high to offset the pressure being applied to press or blow the glass in the neck and blank molds and in the blow molds.

With the completion of the parison formation the blank molds are opened, the application of high pressure to the neck molds is maintained and the valves 197 will not be moved and a friction detent 250 such as shown in detail in FIG. 17 will retain valves 197 in this position during the movement of turret 14 from the parison station to the blowing station.

When the blowing station is reached the blow molds 35 close about the pendant parison and the closing movement of the blow molds is simultaneous with closing of the blank or parison molds at the preceding station. Concurrent with the closing of both molds the cam 190 will again actuate valve 191 which in turn will actuate both valve lifters 211 and 211$^a$ (FIG. 21) and simultaneously apply low closing pressure on the neck molds at both stations No. 1 and No. 2 until the molds are closed.

As previously stated, the valves 197 are then shifted to apply high pressure. This high pressure position will continue at least until the pressing of the parison is completed at Station #1 and the previously pressed parison is blown to final form at the blowing station #2. Thus, when the turret 14 indexes to the blowing station, presenting a parison for blowing, the neck molds are retained closed under the high pressure during the indexing movement but upon reaching the blowing station they again come under control of the low pressure during closing of the blow mold but then high pressure is again applied to hold the neck molds against the pressure applied for the parison expansion. Upon completion of the blowing of the parison to final form, the high pressure is continued.

With the completion of the pressing of a parison at station 1 and the blowing of a bottle at station 2, the turret 14 is again indexed to bring the newly formed parison from station 1 to the blowing station 2 and the blown bottle is moved to the take-out station 3.

Figure 9:
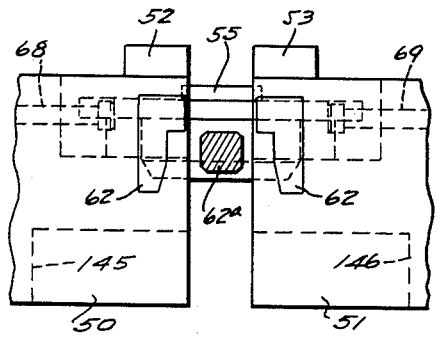
FIG. 9 is a view taken at line 9—9 on FIG. 8 showing the central aligning pin and the contact clips.

As previously set forth herein the neck mold holders 50 and 51 are provided on their upper surfaces with oppositely disposed shaped cam surfaces 145 and 146 arranged for cooperation with rollers 133 and 134 (FIGS. 7, 9 and 11). Upon the neck molds reaching the take-out station 3, the cam 150 on the main cam drum 18 (FIG. 1) actuates valve 151 to actuate pistons 175 and 176 in the head 130 and moves the rollers 133 and 134 downwardly into the same horizontal plane with the cam surfaces 145 and 146 of mold holders 50 and 51. The actuation of pistons 175 and 176 causes the pistons 140 and 141 to rotate the shaft 131 and the rollers 133 and 134 about the vertical axis of the shaft 131, bringing the rollers into contact with the cam surfaces 145 and 146. This contact spreads the mold holders 50 and 51 and their neck mold halves 52 and 53 horizontally apart against the pressure of the exhausting fluid trapped in back of pistons 63 and 63ᵃ of the neck mold holders 51 and 50 respectively. The opening of neck molds 52 and 53 results in releasing the blown ware to a dead plate 127 (FIG. 1) which in turn moves the ware to a lower position for discharge from the machine. With the release of the ware from the neck molds 52 and 53 valve 151 is shifted and the rollers 133 and 134 return to a position out of contact with the cams 145 and 146 and the neck molds remain open until such time as the valve 191 is shifted to the position shown in FIG. 23. Shifting of valve 191 results in the turret being indexed and the foregoing cycle is then repeated in continuing succession.

The general operation of the mechanism constituting this present invention includes the utilization of a glassware forming machine involving a series of forming or operative stations operating in sequence. As illustrated in (FIG. 12) the invention is applied to a machine including three operative stations, namely, parison forming #1, parison blowing #2 and ware take-out #3. At station #1 the neck molds 52 and 53 are in inverted closed position and beneath the blank molds 25 and are initially presented to this station held closed under low pressure in order to permit orientation with and in respect to the parison or blank molds 25. Immediately the blank molds are closed the valve 191 (FIG. 21) permits the high pressure to be applied to the neck mold holder shaft-pistons 63 and 63ᵃ to hold these molds closed against the high internal pressure generated in the formation of the parison per se. At the end of the parison formation, the blank molds 25 open and the valve 191 shifts to unlock pin 271 and actuate the indexing mechanism 286 to move the neck molds and the parisons held therein from station 1 to station 2. With the beginning of the index, cam 97 (FIG. 22) moves the valve 96 and in turn valve 109 and the inverting rack 79 moves to invert the neck molds 52 and 53 and their included parisons. This inversion occurs during the index movement, swinging the parisons in the direction of arrow "A," FIG. 6, namely, inwardly toward the center of rotation of the turret 14, and completing the inversion by or at the same time as the completion of the indexing of turret 14. This brings the parison to station 2 in a pendant position where it is ready to be enclosed in the blow mold 35 and blown to final form.

Before the blow mold is closed, the valve 191 is shifted to raise the valves 197 to apply low pressure to the neck mold closing pistons during closing of the blow mold 35.

Upon the closing of the blow mold 35, the valve 191, under control of cam 190 is positioned to supply pressure through recess 263ᵃ of valve 191 to shift valve 197 and place the neck molds 52 and 53, at both stations 1 and 2, under high pressure closing to offset the pressure applied for shaping and blowing the parisons at these respective stations. This same shifting of valve 191 will also result in connecting the neck mold closing pistons 63 and 63a, located at the takeout station, to exhaust.

With the completion of the shaping and blowing at stations 1 and 2, turret 14 will index to bring the new parison to station 2 and the blown ware to station 3, the take-out station. As the neck molds with the blown ware reach station 3, the cam 159 moves valve 151 to supply pressure to the conduit 170 (FIG. 20), moving the head 132, rollers 133 and 134 downwardly into the same horizontal plane as that of the oppositely disposed cam surfaces 145 and 146 formed on the then upper surface areas of the neck mold holders 50 and 51 (FIG. 8). This downward movement permits pressure to pass to the outer end of a piston 140 (FIGS. 10 and 20) which moves to swing the head 132 about its vertical axis, providing the contact of the rollers 133 and 134 with cam surfaces 145 and 146 to open the neck molds against the exhausted pressure fluid in back of pistons 63 and 63ᵃ. The opening of neck molds 52 and 53 releases the blown ware to the dead plate 127 (FIG. 1) from which it is transferred to the lehr conveyor 40. Valve 151 then shifts under control of cam 150 on drum 18 raising the head 132 and rollers 133 and 134 out of the plane of the neck mold holders 50 and 51 and the valve 191 under control of cam 190 on drum 18 again initiates the indexing of the turret 14 and repeats the forming and blowing cycle just described.

This application is a continuation-in-part of application Serial No. 774,775, filed November 18, 1958, now abandoned.

Modifications may be resorted to within the spirit and scope of the appended claims.

We claim:

1. In a glass article forming apparatus including a rotatable turret arranged to move neck mold units horizontally in a circle form a parison forming station to a blow station and to a takeout station; said turret having a plurality of vertical openings therethrough equally spaced circumferentially of said turret, a neck mold unit mounted in each opening, each said neck mold unit comprising in combination, a pair of opposed cooperative neck mold support halves, each said support half having a horizontally disposed shaft extending outwardly therefrom, said shafts extending into horizontal openings in said turret, each said shaft being movable in said horizontal openings to effect relative movement of said support halves, neck mold halves mounted on the adjacent faces of each said opposed support half and in cooperative glass forming relationship with each other, means mounted on said turret in engagement with said shafts for inverting said supports about said horizontal axis, oppositely disposed internal cam surfaces formed on each of said neck mold support halves, means connected to said turret for applying hydraulic pressure within said horizontal openings to hold said neck molds normally closed at and between said parison forming and blow stations, and means mounted on said apparatus at said take-out station for engaging said cam surfaces to move said neck molds and supports away from each other.

2. In a glass container forming apparatus including a parison forming unit, a parison blowing unit, and a horizontal rotatable turret arranged to move a plurality of neck mold units about a vertical axis and between said parison forming and blowing units, a plurality of neck mold units equally spaced circumferentially and radially on said turret, each said neck mold unit comprising in combination a pair of cooperative neck mold supports split along a radial line to form opposed mold supporting faces, said supports mounted on said turret for rotation about a horizontal axis, means mounting said supports for relative movement along said horizontal axis to open and closed positions, split neck mold halves mounted on said supports in cooperative, glass forming, relationship, means interconnecting said supports to limit relative movement thereof to opening and closing motion, said supports having oppositely disposed cam surfaces formed thereon in horizontal, facing relationship, a neck mold opening device mounted on said apparatus in overlying relationship to said turret, said device comprising a pair of rollers mounted at opposite ends of a horizontal bar having a length greater than the space between said cam surfaces, a vertical rod to which said bar is connected at its center, means for moving said rod and bar into and out of the area between said opposed cam surfaces, hydraulic means connected to said rod for rotating said bar about the vertical axis of said rod, and means responsive to movement of said bar into said area for initiating the operation of said hydraulic means for rotating said bar to open said molds.

3. A glass container forming apparatus in accordance with claim 2 wherein the hydraulic means for rotating said neck mold opening bar includes a pair of oppositely acting hydraulic pistons arranged for horizontal reciprocation, a radial arm extending from said rod and means connecting said pistons to said arm.

4. In a glass container forming apparatus including a parison forming unit, a parison blowing unit, and a horizontal rotatable turret arranged to move a plurality of neck mold units about a vertical axis and between said parison forming and blowing units, a plurality of neck mold units equally spaced circumferentially and radially on said turret, each said neck mold unit comprising in combination a pair of cooperative neck mold supports split along a radial line to form opposed mold supporting faces, said supports mounted on said turret for rotation about a horizontal axis, means mounting said supports on said turret for movement along said horizontal axis to open and closed positions, split neck mold halves mounted on said supports and in cooperative glass forming relationship, a neck mold thimble positioned between and supported by both said mold halves, said neck mold thimble and neck mold halves being carried by and rotatable with said supports about said horizontal axis, means to maintain said thimble generally central of the radial split line between the faces of said mold halves during opening and closing movements of said supports and neck molds, means interconnecting said supports to limit relative movement thereof to opening and closing motion, means connected to said supports for rotating said supports about said horizontal axis in unison, said supports having oppositely disposed vertical cam surfaces formed thereon in facing relationship, a cam surface contacting device common to all said neck mold units, said device comprising a pair of rollers mounted on the ends of a horizontal bar having a length greater than the space between said cam surfaces when said supports are closed, means connected to said bar for moving said bar into and out of the area between said opposed cam surfaces, and hydraulic means connected to said moving means for rotating said bar about a vertical axis, whereby said device will open said neck mold units.

5. A glass container forming apparatus in accordance with claim 4 wherein the hydraulic means for rotating said neck mold opening bar includes a pair of oppositely acting hydraulic pistons arranged for horizontal reciprocation, means connecting said pistons to said moving means and means for supplying fluid under pressure to said pistons alternately.

6. In a glass container forming apparatus including a parison forming unit, a parison blowing unit, and a neck mold carrying turret arranged for horizontal indexing about a vertical axis, a plurality of neck mold units equally spaced circumferentially and radially on said turret, each said neck mold unit comprising in combination a pair of oppositely disposed neck mold support halves, neck mold halves mounted on the inner faces of each said support half, a horizontal shaft connected to each said support half and extending in opposite directions, said shafts extending into openings in said turret and arranged for rotation therein, said shafts further acting as pistons to move and hold said supports and molds in closed position, a supply of fluid under pressure, means connecting said supply behind said pistons to maintain said neck molds closed, means interconnecting said supports to limit relative movement thereof to opening and closing motion, a hydraulically actuated means connected to each said neck mold unit for inverting them about said horizontal axis, a control cam mounted upon and rotatable with said mold units, means alternately connecting said supply of fluid under pressure to one end of said hydraulically actuated means, and connecting the other end to exhaust, a cam follower in engagement with said control cam and movable in response to movement of said cam, and means connected to said follower for regulating the rate of exhaust of fluid from said hydraulically actuated means whereby the rate of inversion is controlled.

7. In a glass container forming apparatus including a parison forming unit, a parison blowing unit, and a neck mold carrying turret arranged for horizontal indexing about a vertical axis, a plurality of neck mold units equally spaced circumferentially and radially on said turret, each said neck mold unit comprising in combination a pair of oppositely disposed neck mold supports, neck mold halves mounted on the inner faces of each said support, a horizontal shaft connected to each said support, said shafts extending into openings in said turret and mounted therein for rotation about their horizontally disposed axes, said shafts adapted to act as pistons to move and hold said supports and neck molds in closed position, means communicating with said openings for continuously supplying hydraulic fluid under pressure to said pistons to maintain said neck molds closed, a neck mold thimble between and slidably supported in each pair of neck mold halves, said neck mold thimble and neck mold halves being carried by and rotatable with said supports about said horizontal axis, means interconnecting said supports to limit relative movement thereof to opening and closing motion, radially extending gear teeth formed on one of said support shafts, a hydraulically actuated piston having teeth in mesh with said gear teeth and providing means individual to said neck mold units for alternately inverting and reverting them about said horizontal axis, a control cam mounted upon and rotatable with said mold supports, a supply of fluid under pressure, means for alternately connecting said supply fluid under pressure to opposite ends of said hydraulically actuated piston, a cam follower in engagement with said control cam and shiftable in response to movement of said cam, and means connected to said follower for adjustably regulating the flow of fluid from said hydraulically actuated piston whereby the rate of inversion of said mold units is controlled throughout the full inversion motion.

8. A glass container forming apparatus in accordance with claim 7 wherein each neck mold unit further includes a second set of radially extending gear teeth formed on the other support shaft, a second hydraulically actuated piston having teeth in mesh with said second set of gear teeth, means connected to said second piston for applying fluid under constant pressure thereto, said second piston being effective to apply a counter torque to said mold support in opposition to the inversion movement, whereby said second piston eliminates back lash and lost motion in the inversion mechanism gearing.

9. In a glassware forming machine of the character disclosed, a frame member, a vertical shaft, means mounting said shaft to said frame member for rotation about its vertical axis, a horizontal turret mounted on said shaft, three equally spaced neck mold units carried by said turret, means for intermittently rotating said turret approximately 120° to bring each of said mold units successively to a plurality of stations, each neck forming unit comprising a pair of neck mold support halves, a pair of neck forming mold halves carried by said support halves, means carried by said turret for successively inverting one neck mold unit during each 120° rotation of said turret, means for simultaneously reverting a second neck mold unit during each 120° rotation of said turret, means for simultaneously maintaining a third neck mold unit in inverted position during each 120° rotation of said turret, means mounted on said frame member for opening each neck mold unit in succession prior to its being reverted, opposed cam surfaces formed upon and individual to each half of said neck mold support halves, said opening means comprising a pair of rollers mounted above said turret and arranged for simultaneous rolling contact with said opposed cam surfaces, and fluid operated means for periodically moving said rollers vertically downward and horizontally outward into actuating contact with said opposed cam surfaces, whereby the successively presented neck molds are opened.

References Cited in the file of this patent

UNITED STATES PATENTS

| | | |
|---|---|---|
| 1,653,723 | Meyer et al. | Dec. 27, 1927 |
| 1,875,202 | Aftergut | Aug. 30, 1932 |
| 2,018,021 | Hofmann | Oct. 22, 1935 |
| 2,041,517 | Rule | May 19, 1936 |
| 2,336,162 | Bridges | Dec. 7, 1943 |
| 2,701,448 | Johnson | Feb. 8, 1955 |
| 2,874,516 | Youkers | Feb. 24, 1959 |

FOREIGN PATENTS

| | | |
|---|---|---|
| 706,460 | Great Britain | Mar. 31, 1954 |